Figure 4:
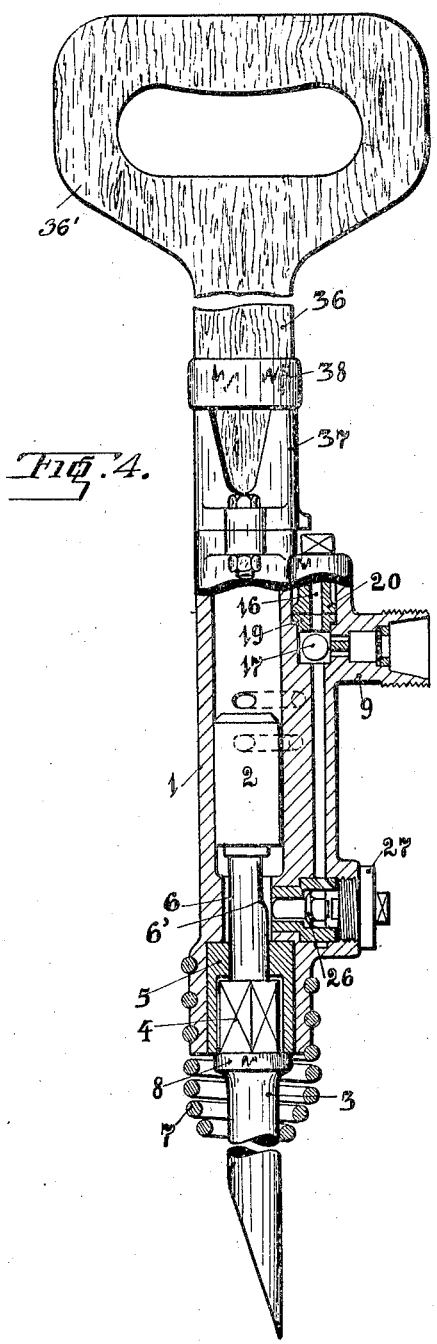

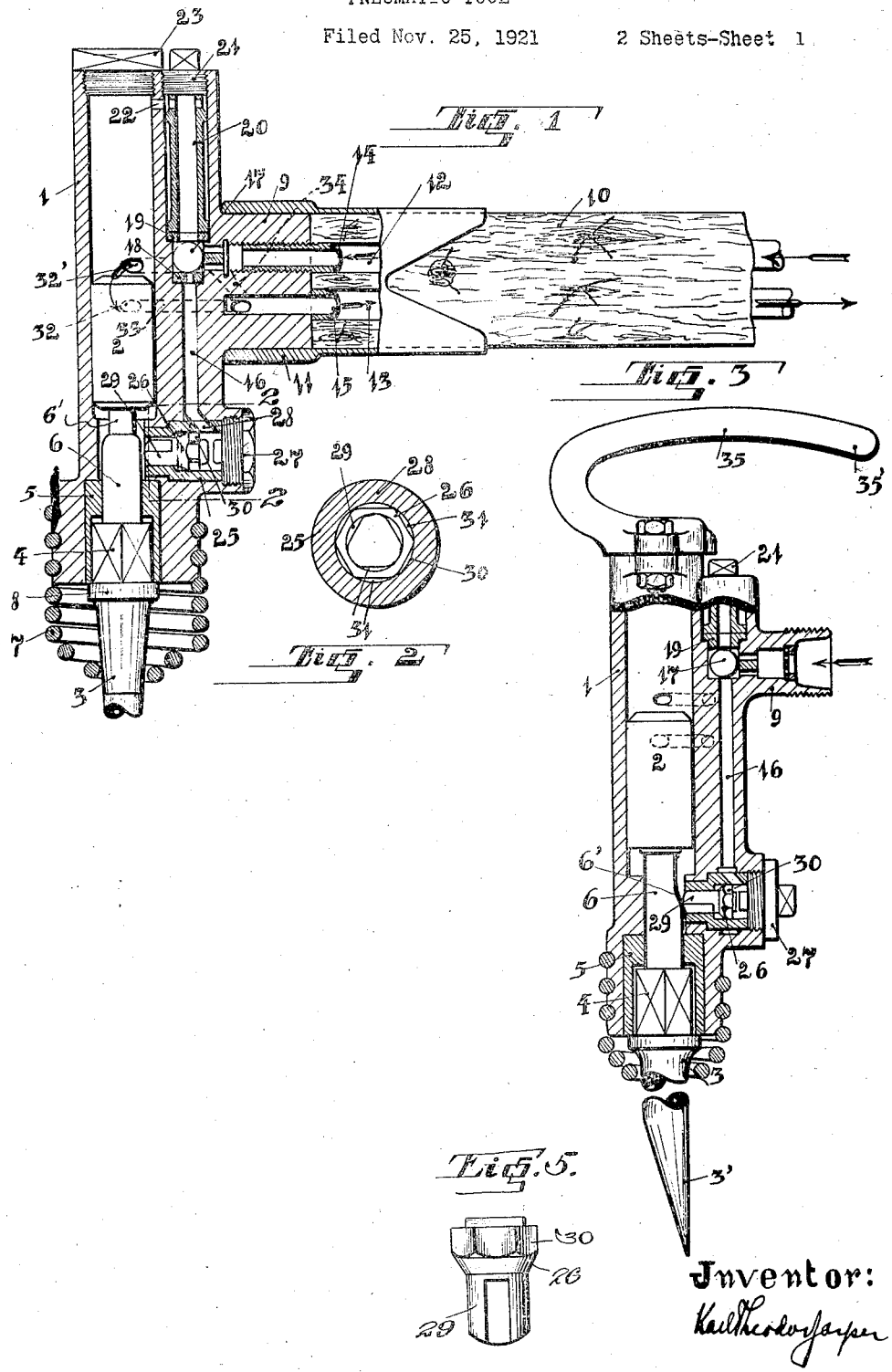

Jan. 4, 1927.

K. T. JASPER 1,613,172

PNEUMATIC TOOL

Filed Nov. 25, 1921   2 Sheets-Sheet 2

Inventor:
Karl Theodor Jasper

Patented Jan. 4, 1927.

1,613,172

UNITED STATES PATENT OFFICE.

KARL THEODOR JASPER, OF HATTINGEN, GERMANY, ASSIGNOR TO THE FIRM MASCHINENFABRIK G. HAUSHERR, E. HINSELMANN & CO., GESELLSCHAFT MIT BESCHRÄNKTER HAFTUNG, OF ESSEN, GERMANY.

PNEUMATIC TOOL.

Application filed November 25, 1921, Serial No. 517,771, and in the Netherlands November 25, 1920.

My invention relates to pneumatic implements and more particularly to implements for cutting rock, coal and similar comparatively hard substances. The implement comprises a cylinder, a tool adapted to reciprocate with regard to said cylinder, a hammer adapted to strike said tool, and the necessary valve gear.

It is an object of my invention to provide an implement of the kind described in which the supply of compressed air to the cylinder is automatically cut off when the tool is not in operative engagement with the work. To this end, I provide a conical starting valve at one end of the cylinder which is held on its seat by the compressed air and lifted from its seat against the action of such air by the tool when it is placed in operative position, and, after having been thus lifted, the valve admits compressed air to said cylinder.

Various handles may be fitted to my implement according to the purpose for which it is used. For instance, with a comparatively long handle secured to one side of the cylinder, the implement operates as a pneumatic pick axe. When it is to be used as a cutting implement, a handle is secured to the free end of its cylinder and, when it is necessary that the tool should penetrate far into the rock, as when cutting coal, a long bar is inserted between the handle and the cylinder.

In the drawings affixed to this specification and forming part thereof, implements embodying my invention are illustrated diagrammatically by way of example. In the drawings—

Fig. 1 is an elevation, partly longitudinal section through the cylinder, of a pneumatic pick axe, Fig. 2 is a section on the line 2—2 in Fig. 1, Fig. 3 is an elevation, partly in section, of a cutting implement having a short handle at one end, Fig. 4 is a similar illustration showing a cutting implement with a long handle at one end, and Fig. 5 is an elevation showing the starting valve.

Referring first to Figs. 1 and 2, 1 is the cylinder of the implement in which reciprocates the hammer 2 which actuates a chisel or other tool 3. The chisel 3 is guided in a chuck 5 of the cylinder 1 by means of a square shank 4 and its upper end is provided with a reduced shank 6 which is reduced in a diameter at 6' and is so long that its end projects into the path of the hammer 2 when the chisel is in the position illustrated, that is, at the rear end of its stroke. A coiled spring 7 prevents the chisel from leaving the chuck 5. The spring is secured in a helical groove at the end of the cylinder. In order to exchange the chisel, the spring is unscrewed. The inward movement of the chisel 3 is limited by a flange 8.

The cylinder 1 has a lateral pipe 9 to which is secured a handle 10, preferably of wood, by means of a sleeve 11. The handle is provided with longitudinal bores 12 and 13, in which are inserted supply and exhaust pipes 14 and 15, respectively. These pipes serve the double purpose of protecting the wood from erosion by the compressed air and further for reinforcing it. The front end of the supply pipe 14 is screwed into the pipe 9 and its rear end is secured to the handle 10 by a nut (not shown), thus assisting in securing the handle 10 to the cylinder.

A chest for a spherical distributing valve 17 is formed in a boss at the side of the cylinder and provided with seats 18 and 19 at either side of the valve 17. The free area of the rear seat 19 is comparatively large and the seat is connected with the rear end of the cylinder by a pipe 20 in a bore of the boss, and a slot 22 at the rear end of the cylinder. The pipe 20 is held in its bore by a plug 21, and a plug 23 is inserted in the rear end of the cylinder beyond the slot 22. Preferably the plug 21 is locked by the plug 23 or vice versa.

The free area of the front seat 18 is smaller than that of the rear seat 19 and connected with a bore 16. This bore opens into a transverse bore near the front end of the cylinder in which is inserted a sleeve 25 which is slotted at 28, the slot registering with the bore 16, and a plug 27 is provided for holding the sleeve against a shoulder in the wall of the cylinder. A conical valve 26, the starting valve, is seated in said sleeve 25.

The valve 26 is provided with two cylindrical guiding extensions 29 and 30 which are provided with flat faces 31 for the purpose of allowing air to pass. The extension 29 may for instance have three and the extension 30 six such faces. The dimensions of the faces are such that they just suffice to let the air pass in both directions without unduly throttling it. The length of the extension 29 is such that it projects into the cylinder 1 when the valve 26 is on its seat. The outward movement of the valve 26 is limited by the plug 27. Exhaust ports 32, 32' and passages 33 and 34 connect the cylinder with the exhaust pipe 15.

The operation of my improved tool is as follows: When the tool 3 is placed in position on the work, the shank 6 forces the conical valve 26 to the right into the opening position. The hammer 2 is at the forward end of its stroke and lays open the rear exhaust port 32'. In consequence thereof, the rear end of the cylinder is under atmospheric pressure and the compressed air which enters through the pipe 14 forces the ball valve 17 on its rear seat 19 which has the wider opening. The compressed air now flows through the seat 18 with the narrower opening into the passage 16, the passage 28 and to the front end of the cylinder past the conical valve 26. The hammer 2 is now moved to the rear, closes the passage 32' and opens the passage 32. Atmospheric pressure is now established on the front face of the hammer 2 so that the ball valve 17 is forced onto its front seat 18 by the compressed air which enters through the pipe 14. The compressed air now enters the rear end of the cylinder 1 through the opening of the seat 19, the pipe 20 and the passages 22 so that the hammer 2 is moved in a forward direction and strikes the shank 6 of the chisel 3. The air which is compressed in front of the hammer 2 escapes past the open valve 26 and gets to the wall valve 17 through the passage 16. As soon as the hammer 2 lays open the port 32', the cylinder to the rear of the piston is connected with the atmosphere and the valve 17 is again forced on its seat 19, whereupon the cycle of operations begins anew. This is continued as long as the tool is held in contact with the work and the valve 26 is thereby held open. When the tool is withdrawn from the work so that the reduced portion 6' of the shank 6 faces the valve 26, the compressed air closes the valve 26 and thereby cuts off the supply of compressed air to the front end of the cylinder. At the same time, the compressed air forces the ball valve 17 onto its rear seat 19 and thereby cuts off the supply of compressed air to the rear end of the cylinder, so that the tool is instantly arrested.

The modification illustrated in Fig. 3 is distinguished from the one just described in that instead of the handle 10 arranged at the side of the cylinder 1 a handle 35 is arranged at the end of the cylinder. This handle may be secured to the cylinder, directly, as shown or to its closing plug 23. The handle 35 may be extended to one side of the implement so as to form a sort of lever 35' in order to facilitate the breaking up of the rock or the like. The extension 6 of the chisel 3 is provided with a cam face 6' which opens the valve 26 more or less according to the position of the chisel in the cylinder 1, that is, in proportion to the pressure which the chisel exerts on the work. In this manner the air admitted to the front face of the hammer is wire-drawn more or less and so the force by which the hammer is impelled on its return stroke, is varied, and, as the intensity at which the hammer strikes the shank 6 on its forward stroke, is determined by the conditions under which the preceding return stroke has been performed, the intensity of the hammer blows is varied by the wire-drawing of the air supply to the front face of the hammer.

Preferably, the point 3' of the chisel is arranged eccentrically and on that side of the axis of the cylinder where the inclined face 6' is formed on the shank 6.

In every other respect, the construction and operation of this implement are as described with reference to Figs. 1 and 2.

In the implement illustrated in Fig. 4, a bar 36 is inserted between the handle 36' and the cylinder 1. This construction, as mentioned, will be provided if the implement penetrates deeply into the rock. The bar 36 may be secured to the cylinder in various ways. It may be secured directly to the cylinder, as illustrated by way of example, or may be secured to the closing plug 23. In order to reduce the weight of the handle and to facilitate the operation of the implement, the bar and its handle are preferably made of wood, and if so made, the bar 36 may be secured to the cylinder by a sleeve 37 and a clamping ring 38. A handle like the handle 10 in Fig. 1 may be secured to the pipe 9. Instead of the bar 36, a handle similar to 35 may be secured at the end of the cylinder 1 so that the implement may be used for deep cutting, for breaking and as a pick axe, according to the type of handle with which it is equipped.

I wish it to be understood that I do not desired to be limited to the exact details of construction shown and described, for obvious modifications will occur to a person skilled in the art.

I claim:

1. A pneumatic implement comprising a cylinder, a hammer adapted to reciprocate in said cylinder, a tool adapted to be displaced axially with regard to said cylinder and to be acted on by said hammer, said cylinder defining a valve chest, a passage for supplying air to said chest, and passages connecting both ends of said cylinder with said chest, a distributing valve seated in said chest and adapted to control the flow of air from said supply passage to said passages leading from said chest to the ends of said cylinder, a conical starting valve arranged in a passage for supplying air to said cylinder, said starting valve being adapted to be forced on its seat by the air in said passage, and a head on said tool which is adapted to lift said valve from its seat and to allow it to become reseated under the action of the air pressure in the passage in which it is arranged.

2. Pneumatic implement comprising a cylinder, a hammer adapted to reciprocate in said cylinder, a tool adapted to be displaced axially with regard to said cylinder and to be acted on by said hammer, said cylinder defining a valve chest, a passage for supplying air to said chest, and passages connecting both ends of said cylinder with said chest, a distributing valve seated in said chest and adapted to control the flow of air from said supply passage to said passages leading from said chest to the ends of said cylinder, a conical starting valve arranged in a passage for supplying air to said cylinder, said starting valve being so arranged that its axis is in the direction in which the fluid is flowing and adapted to be forced on its seat by the air in said passage, and a head on said tool which is adapted to lift said valve from its seat and to allow it to become reseated under the action of the air pressure in the passage in which it is arranged.

3. Pneumatic implement comprising a cylinder, a hammer adapted to reciprocate in said cylinder, a tool adapted to be displaced axially with regard to said cylinder and to be acted on by said hammer, said cylinder defining a valve chest, a passage for supplying air to said chest, and passages connecting both ends of said cylinder with said chest, a distributing valve seated in said chest and adapted to control the flow of air from said supply passage to said passages leading from said chest to the ends of said cylinder, a conical starting valve arranged in a passage for supplying air to said cylinder, said starting valve being adapted to be forced on its seat by the air in said passage, an extension formed on that end of said valve which is directed toward said cylinder and a head on said tool which is adapted to cooperate with said extension and to lift said valve from its seat and to allow it to become reseated under the action of the air pressure in the passage in which it is arranged.

4. Pneumatic implement comprising a cylinder, a hammer adapted to reciprocate in said cylinder, a tool adapted to be displaced axially with regard to said cylinder and to be acted on by said hammer, said cylinder defining a valve chest, a passage for supplying air to said chest, and passages connecting both ends of said cylinder with said chest, a distributing valve seat in said chest and adapted to control the flow of air from said supply passage to said passages leading from said chest to the ends of said cylnder, a conical starting valve arranged in a passage for supplying air to said cylinder, said starting valve being adapted to be forced on its seat by the air in said passage, and a head on said tool which is adapted to lift said valve from its seat by axial displacement and to allow it to become reseated under the action of the air pressure in the passage in which it is arranged.

5. Pneumatic implement comprising a cylinder, a hammer adapted to reciprocate in said cylinder, a tool adapted to be displaced axially with regard to said cylinder and to be acted on by said hammer, said cylinder defining a valve chest, a passage for supplying air to said chest, and passages connecting both ends of said cylinder with said chest, said last mentioned passages extending substantially in parallel to the axis of said cylinder, a distributing valve seated in said chest and adapted to control the flow of air from said supply passage to said passages leading from said chest to the ends of said cylinder, a conical starting valve arranged in a passage for supplying air to said cylinder, said starting valve being adapted to be forced on its seat by the air in said passage, and a head on said tool which is adapted to lift said valve from its seat and to allow it to become reseated under the action of the air pressure in the passage in which it is arranged.

6. Pneumatic implement comprising a cylinder, a hammer adapted to reciprocate in said cylinder, a tool adapted to be displaced axially with regard to said cylinder and to be acted on by said hammer, said cylinder defining a valve chest, a seat at each end of said chest, a cylinder defining a passage for supplying air to said chest, said passage being connected to said chest between said seats, and passages connecting both ends of said cylinder with said chest, a distributing valve adapted to cooperate with said seats to control the flow of air from said supply passage to said passages leading from said chest to the ends of said cylinder, a conical starting valve arranged in a passage for supplying air to said cylinder, said starting valve being adapted to be forced on its seat by the air in said passage, and a head on said tool which is adapted to lift said valve from its seat and to allow it to become reseated under the action of the air pressure in the passage in which it is arranged.

In testimony whereof I affix my signature.

KARL THEODOR JASPER.